(12) United States Patent
Gierer et al.

(10) Patent No.: US 7,243,767 B2
(45) Date of Patent: Jul. 17, 2007

(54) TRANSMISSION HYDRAULIC CONTROL UNIT

(75) Inventors: Georg Gierer, Kressbronn (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 218 days.

(21) Appl. No.: 11/135,972

(22) Filed: May 24, 2005

(65) Prior Publication Data

US 2005/0269181 A1  Dec. 8, 2005

(30) Foreign Application Priority Data

Jun. 3, 2004  (DE) ...................... 10 2004 027 115

(51) Int. Cl.
*F16H 57/04* (2006.01)
*F16H 61/14* (2006.01)

(52) U.S. Cl. .................... 192/3.3; 192/3.63; 192/113.1

(58) Field of Classification Search ...................... None
See application file for complete search history.

(56) References Cited

U.S. PATENT DOCUMENTS

| | | | |
|---|---|---|---|
| 5,305,862 A | | 4/1994 | Gierer |
| 5,700,226 A | * | 12/1997 | Droste ........................ 477/156 |
| 6,068,569 A | * | 5/2000 | Redinger et al. ........... 475/159 |
| 6,350,215 B1 | * | 2/2002 | Gierling ...................... 475/159 |
| 6,668,978 B2 | | 12/2003 | Fessler et al. |

FOREIGN PATENT DOCUMENTS

| | | |
|---|---|---|
| DE | 39 37 939 A1 | 6/1990 |
| DE | 40 20 239 A1 | 2/1991 |
| DE | 198 48 935 A1 | 4/2000 |
| DE | 100 44 177 C1 | 1/2002 |
| DE | 199 02 408 C2 | 1/2003 |
| DE | 103 02 016 A1 | 7/2004 |

* cited by examiner

*Primary Examiner*—Rodney H. Bonck
(74) *Attorney, Agent, or Firm*—Davis Bujold & Daniels, P.L.L.C.

(57) ABSTRACT

A hydraulic system of a transmission, for an automatic transmission of a motor vehicle, having several pressure circuits which can be loaded with hydraulic fluid from a pressure source and in relation to the supply of different areas of the transmission are differently prioritized. The pressure in the pressure circuits is adjustable according to a system valve and one of the pressure circuits comprises a cooling device for the hydraulic fluid and a lubrication circuit located downstream of the cooling device. Between the cooling device and the lubrication circuit is provided a bypass pipe, blockable via a valve unit, which can be controlled via the valve unit so that the hydraulic fluid flow rate to be passed via the cooling device can be adjusted without changing the hydraulic fluid flow rate to be fed to the lubrication circuit.

20 Claims, 6 Drawing Sheets

TRANSMISSION HYDRAULIC CONTROL UNIT

This application claims priority from German Application Ser. No. 10 2004 027 115.1 filed Jun. 3, 2004.

BACKGROUND OF THE INVENTION

Field of the Invention

The invention concerns a hydraulic system of a transmission of a motor vehicle.

DE 198 48 935 A1 has disclosed an automatic transmission for vehicles having a hydraulic system designed with several pressure circuits which can be loaded with hydraulic fluid from a pressure source and are differently prioritized in relation to the supply with hydraulic fluid of different areas of the transmission. The pressure in the pressure circuits is adjusted according to a system pressure valve or a high pressure valve. One of the pressure circuits comprises at least one cooling device for the hydraulic fluid and one lubrication circuit of the transmission which is located downstream of the cooling device and together with the friction clutch, departing from the cooling device, is supplied via a hydraulic pipe extending parallel with the lubrication circuit with part of the hydraulic fluid flow rate emerging from the cooling device.

It is provided that the friction clutch, during a slipping phase, be supplied with an increased amount of hydraulic fluid in order to ensure, even in the case of a minimal hydraulic flow rate through the cooling device, a sufficient cooling of the friction clutch during the slipping operation.

By way of the lubrication circuit of an automatic transmission are usually lubricated the wheel sets, multi-disc clutches, multi-disc brakes and bearing points of the automatic transmission provided for producing the different ratio steps of the automatic transmission and thus the automatic transmission described in DE 198 48 935 A1 is designed with a combined cooling lubrication system.

In the layout of such cooling lubrication systems of automatic transmissions, what is fundamentally taken into consideration in the practice is the operating state of the automatic transmission in which the maximum hydraulic fluid flow rate is needed for lubricating and cooling the different parts of an automatic transmission. This operating state is characterized by the maximum engine rotational speed, a maximum torque to be passed via the transmission and a hydraulic fluid temperature. This means that the cooling lubrication system or the hydraulic system is dimensioned so that in the presence of a prescribed operating state of the automatic transmission the amount of hydraulic fluid required for lubrication and cooling is turned around in the transmission.

This procedure, however, results in the disadvantage that in the operating states of the automatic transmission, such as at low engine rotational speeds and, at the same time, low hydraulic fluid temperature, a hydraulic fluid flow rate greater than that actually required is passed through the hydraulic system of an automatic transmission. In turn, this means that over broad operating areas of an automatic transmission, a considerably over-dimensioned hydraulic fluid flow rate is passed through the automatic transmission for cooling and lubricating. In the area of deactivated multi-disc clutches high drag torques are produced as a result of the great hydraulic fluid flow rate and besides the hydraulic fluid is undesirably heated very slowly so that only after a certain operation period the operating temperature needed for a good lubrication below is achieved, which a sufficient lubrication is available only to a limited extent. Thereby a degree of efficiency of an automatic transmission deteriorates and fuel consumption of a motor vehicle is undesirably increased.

Therefore, the problem on which this invention is based is to provide a hydraulic system of a transmission which, in an easy way, is structurally convertible and with which, among other things, a high degree of efficiency of the transmission can be attained.

SUMMARY OF THE INVENTION

With the inventive hydraulic system of a transmission, especially an automatic transmission of a motor vehicle, having several pressure circuits which can be loaded with hydraulic fluid from a pressure source and are differently prioritized with regard to the supply with hydraulic fluid of different areas of the transmission and wherein the pressure in the pressure circuits is adjustable depending on a system pressure valve and one of the pressure circuits comprises at least one cooling device for the hydraulic fluid and one lubrication circuit of the transmission located downstream of the cooling device, a high degree of efficiency of the transmission can be practically achieved in an easy manner.

This is accomplished by the fact that between the cooling device and the lubrication circuit, one blockable bypass pipe, via a valve unit, is provided and structurally easy to implement, which can be controlled, via the valve unit, so that the hydraulic fluid flow rate to be passed, via the cooling unit, can be adjusted without changing the hydraulic fluid flow rate to be supplied to the lubrication circuit.

This means that the hydraulic fluid flow rate to be passed via the cooling device can be increased for boosting the cooling power of the cooling device without changing the hydraulic fluid flow rate passed via the lubrication circuit of the transmission. To that end, branching off from the pressure circuit between the cooling device and the lubrication circuit, the bypass pipe is opened by the valve unit so that the hydraulic fluid flow rate additionally passed, via the cooling device, can be removed from the pressure circuit and the hydraulic flow rate fed to the lubrication circuit is kept constant.

This also means, however, that the hydraulic fluid flow rate passed through the hydraulic system in different operating states of the transmission subject to the layout, and in the area of parts of the transmission supplied with hydraulic fluid via the lubrication circuit is known to produce undesired power losses in the transmission, depending on the existing operating state of the transmission, can be adapted via the bypass pipe controllable by the valve unit to the actual operating state so that the power losses in the area of the shifting elements of the transmission designed as multi-disc clutches or multi-disc brakes are reduced whereby the deterioration of the efficiency degree of the transmission is advantageously prevented.

BRIEF DESCRIPTION OF THE DRAWINGS

The invention will now be described, by way of example, with reference to the accompanying drawings. For the sake of clarity in the description of the different embodiments, the same reference numerals for parts having the same structure and operation have been used. In the drawing.

DETAILED DESCRIPTION OF THE INVENTION

Figure 1:
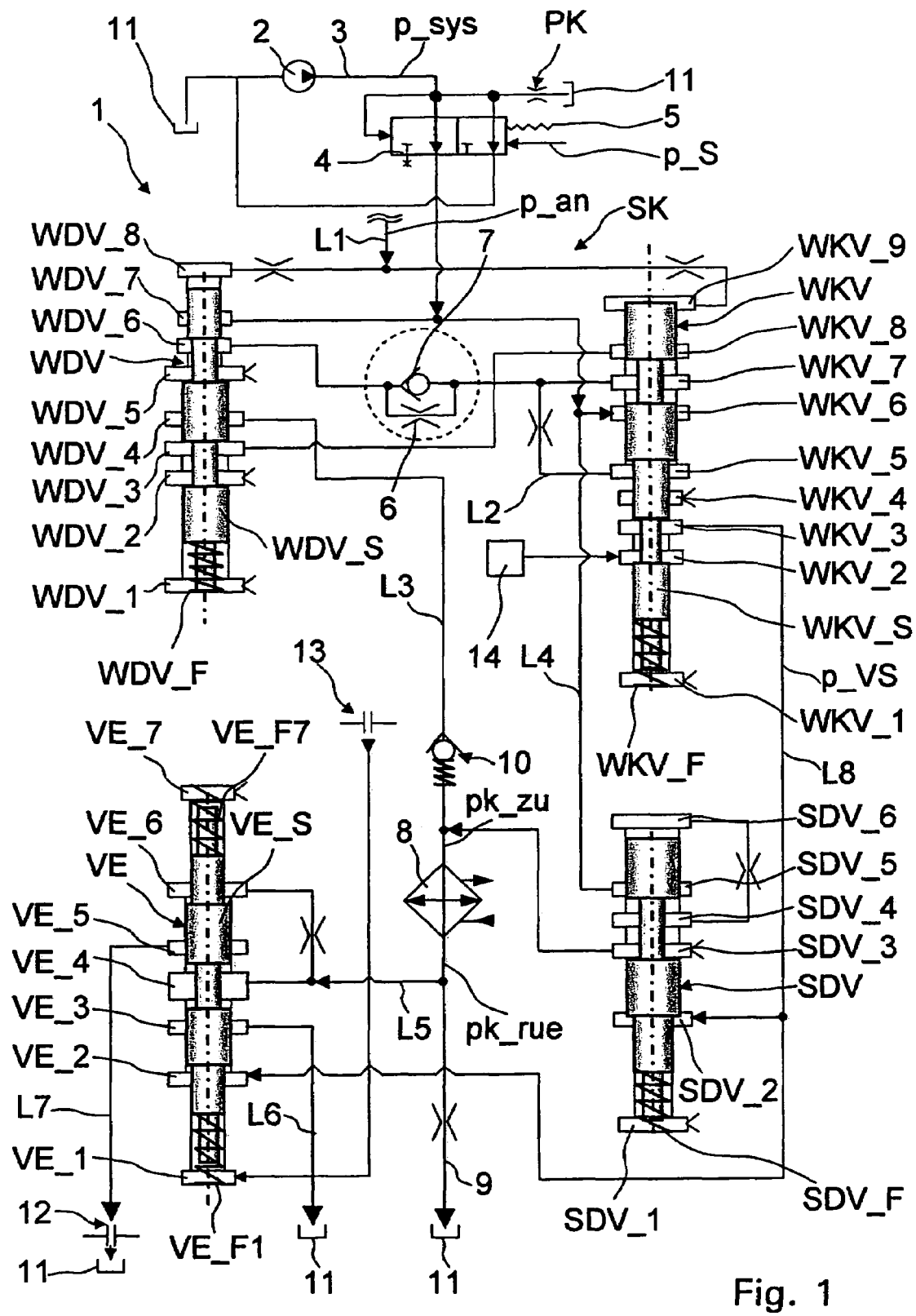
FIG. 1 shows an extensively schematized circuit diagram of one design of the inventive hydraulic system.

FIG. 1 shows a circuit diagram of a hydraulic system 1 of an automatic transmission of the motor vehicle (not shown in detail). The hydraulic system 1 shows a pump 2. In addition, for implementing hydraulically controllable and/or regulatable transmission functions, the hydraulic system 1 is designed with one pressure circuit or one primary pressure circuit PK and one second pressure circuit or one secondary pressure circuit SK the supply of which with a hydraulic fluid or transmission oil rolled over in the hydraulic system 1, is differently prioritized. Both hydraulic pressure circuits PK, SK are located on a delivery side 3 of the pump 2 and can have different pressure levels depending on a configuration of a system pressure valve 4 designed as a pressure-limiting valve. The prioritization is implemented via the system pressure valve 4 of conventional design situated upon the delivery side 3 of the pump 2 and whose pressure limitation can be adjusted, depending on the operating state, via a spring mechanism 5 and a control pressure p_S presettable by a transmission control.

Due to the arrangement of the system pressure valve 4, only the primary pressure circuit PK of the pump 2 is first pressurized with a hydraulic fluid flow rate when the delivery pressure, actually made available by the pump 2, is weaker than a pressure value leading to opening of the system pressure valve 4. If a pressure value, adjusted on the system pressure valve 4, is reached, the system pressure valve opens and the secondary pressure circuit SK is connected with the delivery side 3 of the pump 2.

The system pressure valve 4 is loaded by the spring mechanism 5, the same as with the control pressure p_S with a force acting in closing direction of the system pressure valve 4. The system pressure valve 4 is additionally loaded in opening direction of the system pressure valve 3 with the pressure of the delivery side 3 of the pump 2 which corresponds to the pressure of the primary pressure circuit PK. The pressure of the primary pressure circuit PK is thus adjustable according to the control pressure p_S. That is, the system pressure valve 4 opens first when reaching a saturation value of the pressure of the primary pressure circuit PK which loads the system pressure valve 4 with a force stronger than the force component acting in closing direction of the system pressure valve 4 and is composed of the spring tension of the spring mechanism 5 and the pressure force resulting from the control pressure p_S. If the opening pressure of the system pressure valve 4 is reached, both the primary pressure circuit PK and the secondary pressure circuit SK of the pump 2 are supplied with hydraulic fluid.

The secondary pressure circuit SK comprises one hydrodynamic torque converter 6 and one regulated converter clutch 7, the hydrodynamic torque converter 6 being designed as a so-called two-line converter known per se. The hydrodynamic torque converter 6 and the regulated converter clutch 7, shown in FIG. 1, are extensively schematized in the form of a throttle point, the same as of a recoil valve. The hydrodynamic torque converter 6 is controlled by a converter pressure valve WDV designed with several control chambers WDV_1 to WDV_8 of a spring mechanism WKV_F and one slide valve WDV_S. The regulated converter clutch 7 is controlled via a converter clutch valve WKV which is, likewise, designed with several control chambers WKV_1 to WKV_9 of a spring mechanism and one slide valve WKV_S.

Downstream of the hydrodynamic torque converter 6 and of the regulated converter clutch 7, a cooling device 8 and a lubrication circuit 9 of the secondary pressure circuit SK, the same as a lubrication pressure valve SDV and a valve unit VE, are provided, the lubrication pressure valve SDV and also the valve unit VE being each designed with several control chambers respectively SDV_1 to SDV_6 and VE_1 and VE_7, spring mechanism SDV_F and/or VE_F1 and VE_F7 and sliding valves SDV_S and VE_S.

The cooling device 8 is provided for cooling of the hydraulic fluid flow rate turned over in the hydraulic system 1 by a heat exchange with the surroundings of the transmission. The lubrication circuit 9, as shown in FIG. 1, situated downstream of the cooling device 8 is shown only extensively schematized and shows a lubrication circuit known per se by way of which multi-disc clutches, wheel sets and also bearing points located in the transmission are lubricated and cooled.

The converter pressure valve WDV and the converter clutch valve WKV are loaded with a control pressure p_an, via a feed pipe L1, by a control system (not shown in detail) on front faces which communicate with the control chambers WDV_8 and WKV_9 against the slide valves WDV_S and WKV_S situated in the control chambers WDV_1 and WKV_1; two different operating states being adjustable in the transmission depending on the control pressure p_an abutting via the pipe L1 on the converter pressure valve WDV and/or on the converter clutch valve WKV.

The first operating state WK_auf is characterized by the fact that the regulated converter clutch 7 is open and the hydraulic flow rate passed via the system pressure valve 4 to the secondary circuit SK, in the seventh control chamber WDV_7 of the converter pressure valve WDV, when the slide valve WDV_S of the converter pressure valve WDV is in adequate position, is fed via the sixth control chamber WDV_6 of the converter pressure valve WDV to the hydrodynamic torque converter 6 and from there is relayed in direction of the converter clutch valve WKV.

The secondary operating state WK_zu of the hydraulic system 1 is characterized by the fact that the hydraulic flow rate flowing into the secondary circuit SK via the system pressure valve 4 flows in the direction of the converter clutch valve WKV, since the slide valve WDV_S of the converter pressure valve WDV blocks the sixth control chamber WDV_6 against the seventh control chamber WDV_7.

In the position shown in FIG. 1 of the slide valve WDV_S of the converter pressure valve WDV, the hydraulic fluid flow rate introduced in the secondary circuit SK via the sixth control chamber WKV_6 and the seventh control chamber WKV_7 of the converter clutch valve WKV is passed to the regulated converter clutch 7 so that the regulated converter clutch 7 is closed or is in a regulated state. Part of the hydraulic fluid flow rate passed in the direction of the regulated converter clutch 7 is simultaneously passed via a pipe L2, departing from the seventh control chamber WKV_7, to the fifth control chamber WKV_5 of the converter clutch valve WKV which is deaerated via the fourth control chamber WKV_4.

During the first operating state WK_auf, the cooling device 8 and the lubrication circuit 9, located downstream of the cooling device 8, are pressurized with hydraulic fluid departing from the system pressure valve 4 via the seventh control chamber WDV_7 and the sixth control chamber WDV_6 of the converter pressure valve WDV; the hydrodynamic torque converter 6, the seventh control chamber WKV_7 and the eighth control chamber WKV_8 of the converter clutch valve WKV, the third control chamber WDV_3 and the fourth control chamber WDV_4 of the converter pressure valve WDV, there being provided in a connecting pipe L3 extending between the fourth control chamber WDV_4 of the converter pressure valve WDV and the cooling device 9; one recoil valve 10 which, departing from the cooling device 8, blocks in the direction of the converter pressure valve WDV.

During the second operating state WK_zu, the hydraulic fluid fed via the system pressure valve 4 to the secondary circuit SK is passed to the cooling device 8 via a hydraulic pipe L4 which extends between the system pressure valve 4 and the cooling device 8 and discharges between the recoil valve 10 and the cooling device 8 in a connecting line L3, the hydraulic fluid flow rate in corresponding position of the sliding valve SDV_S of the lubrication pressure valve SDV being introduced in the connecting pipe L3 upstream of the cooling device 8 via the fifth control chamber SDV_5 and the third control chamber SDV_3 of the lubrication pressure valve SDV.

Between the cooling device 8 and the lubrication circuit 9, one bypass pipe L5, blockable via the valve unit VE, is provided which can be controlled via the valve unit VE in a manner such that the hydraulic fluid flow rate to be passed via the cooling device 8 is adjustable without changing the hydraulic fluid flow rate to be fed to the lubrication circuit 9. At the same time, the bypass pipe L5 which discharges in the fourth control chamber VE_4 of the valve unit VE, when the slide valve VE_S of the valve unit VE is in adequate position, is connected with one other pipe L6 leading to a hydraulic fluid reservoir 11 or with an additional pipe L7 leading to a frictionally engaged shifting element 12 of the transmission.

It is thus easily possible to increase the hydraulic fluid flow rate to be passed, as needed, via the cooling device 8, depending on the actually existing operating state of the transmission without changing the hydraulic fluid flow rate to be passed via the lubrication circuit 9, since the additional hydraulic fluid flow rate, via the bypass pipe L5, when the slide valve VE_S of the valve unit VE is in adequate position, can easily be branched off the secondary circuit SK before the lubrication circuit 9 and be sprayed off in the hydraulic fluid reservoir 11 or the oil sump of the transmission.

Alternative to this, the hydraulic fluid flow rate branched off the secondary circuit SK, via the bypass pipe L5, can be passed via the valve unit VE and the additional pipe L7 to the frictionally engaged shifting element 12 in order that the latter, in operating states of the transmission in which high loads occur in the shifting element 12 (for example, during a slip operation) can be cooled with the fed hydraulic fluid flow rate.

The shifting element 12 is one frictionally engaged shifting element of the transmission which is engaged in the power flow of the transmission with one other shifting element 13 to produce a starting ratio of the transmission capacity of which, at least in the beginning of the starting operation of a motor vehicle, is reduced so that a transmission capacity of the force-locking connection between the prime mover of the motor vehicle and one output is reduced until the prime mover can more easily be brought to a desired rotational speed thus making possible to implement a more comfortable operation with a sufficient traction supply.

The transmission capacity of the shifting element 12 is then boosted again so that the power flow between the prime mover and the output of a vehicle is entirely produced, the shifting element 12 being operated slip free in this operation state. By said procedure, a starting weakness predominantly existing in prime movers, designed as diesel combustion engines, is easily prevented or reduced so that an uninterrupted and comfortable starting of a motor vehicle designed with a diesel combustion engine is possible for a driver.

The valve unit VE, depending on the pressure generated by the actuator of the transmission control provided for control of the other shifting element 13 or another pressure value corresponding thereto, is here controlled so that the frictionally engaged shifting element 12 or the starting clutch is supplied with hydraulic fluid or cold oil departing from the secondary pressure circuit SK between the cooling device 8 and the lubrication circuit 9. To this end, a pressure quantity of the other shifting element 13 is preferably used and engaged in the power flow of the transmission to produce a starting ratio which, together with the starting clutch or the shifting element 12, produces a positive engagement in the starting ratio. That is, preferably in the first forward gear of the transmission, after an upshift to the second forward gear or second ratio step of the transmission, the cooling or additional cooling of the starting clutch 12 produced via the valve unit VE or the added valve element VE_V, is interrupted and the branched off hydraulic fluid flow rate is available for lubrication of the transmission.

In order to be able to convert the prescribed functionalities of the inventively designed hydraulic system 1, both the lubrication pressure valve SDV and the valve unit VE are to be connected with a hydraulic control circuit 14. The lubrication pressure valve SDV and the valve unit VE are controlled departing from the control circuit 14 with a pilot pressure p_VS which in the embodiment of the hydraulic system 1, according to FIG. 1, is introduced in the second control chamber SDV_2 of the lubrication pressure valve SDV and in the second control chamber VE_2 of the valve unit, via the second control chamber WKV_2, and the third control chamber WKV_3 of the converter clutch valve WKV, the same as a control pipe L8.

The mode of operation of the valve unit VE appears here, depending on the spring mechanisms VE_F1 and VE_F7 located in the control chambers VE_1 and VE_7 on both ends of the slide valve VE_S of the valve unit VE, a pilot pressure p_VS, the same as a control pressure of the additional shifting element 13 abutting from the additional shifting element 13 in a first control chamber VE_1 or a control quantity equivalent to the control pressure. This means that the connection between the bypass pipe L5 and the shifting element 12 is open when on the side valve VE_S of the valve unit VE a force component acts which, composed of said spring and pressure forces abutting on the slide valve VE_S of the valve unit VE, results in a manner such that the fourth control chamber VE_4 of the valve unit VE is connected with the fifth control chamber VE_5 of the valve unit VE.

The pilot pressure p_VS is adjusted by one actuator which changes a system pressure p_sys of the transmission. That is, the pressure in the primary circuit PK, since the system pressure p_sys also has to be boosted during operating states, is characterized by high rotational speeds or high loads. This means that the control pressure p_S and the pilot pressure p_VS are generated by the same electronic pressure adjuster of the transmission control. It obviously can also be provided that the control pressure p_S and the pilot pressure p_VS be generated by different pressure adjusters, but this is costlier and, in addition, causes the need for more installation space in the transmission control.

In the first operating state WK_auf, a pressure pk_zu in the secondary circuit SK, before the cooling device 8 is not substantially altered since when the converter clutch 7 is open, a constant flow rate and a constant pressure must exist in the converter circuit so as to make ensuring the mode of operating of the hydrodynamic torque converter 6 possible. But therefrom also results that the valve unit VE, designed also as a pressure-limiting valve, to alter the hydraulic fluid flow rate to be passed via the cooling device 8, has to be controlled so that a pressure pk_rue after the cooling device 8 be altered so that the hydraulic fluid flow rate passed via the cooling device 8 varies according to the changed pressure drop. At the same time, the hydraulic fluid flow rate passed via the cooling device 8 will increase as the pressure drop increases over the cooling device 8 and diminishes as the pressure drop decreases. The pressure drop over the cooling device 8, in the first operating state WK_auf in which the pressure pk_zu is in the secondary circuit SK before the cooling device 8, essentially can be altered only via the reaction pressure level in the valve unit VE in which the valve unit VE connects the bypass pipe L5 with the other pipe L6 or the additional pipe L7.

In the embodiment of the inventive hydraulic system 1, shown in FIG. 1, the lubrication pressure valve SDV is configured and controlled by the hydraulic control circuit 14 when the converted clutch 7 is closed or in the regulating state of the converter clutch 7 in a manner such that the cooling device 8 is pressurized with hydraulic fluid via the hydraulic pipe L4, since the connection between the fifth control chamber SDV_5 and the third control chamber SDV_3 of the lubrication pressure valve SDV is released by the slide valve SDV_S of the lubrication pressure valve SDV.

In the second operating state WK_zu of the hydraulic system 1, in which the hydraulic fluid flow rate to be passed via the cooling device 8 is introduced via the hydraulic pipe L4 between the recoil valve 10 and the cooling device 8 in the connecting pipe L3, the pressure pk_zu in the connecting pipe L3 before the cooling device 8 is altered via the pilot pressure p_VS and the hydraulic fluid flow rate passed via the cooling device 8 is thus changed. At the same time, it obviously is possible to change the hydraulic fluid flow rate to be passed via the cooling device 8 by the prescribed change of the reaction pressure level of the valve unit VE by way of which the pressure in the connecting pipe L3 after the cooling device 8 can be adjusted.

Figure 2:
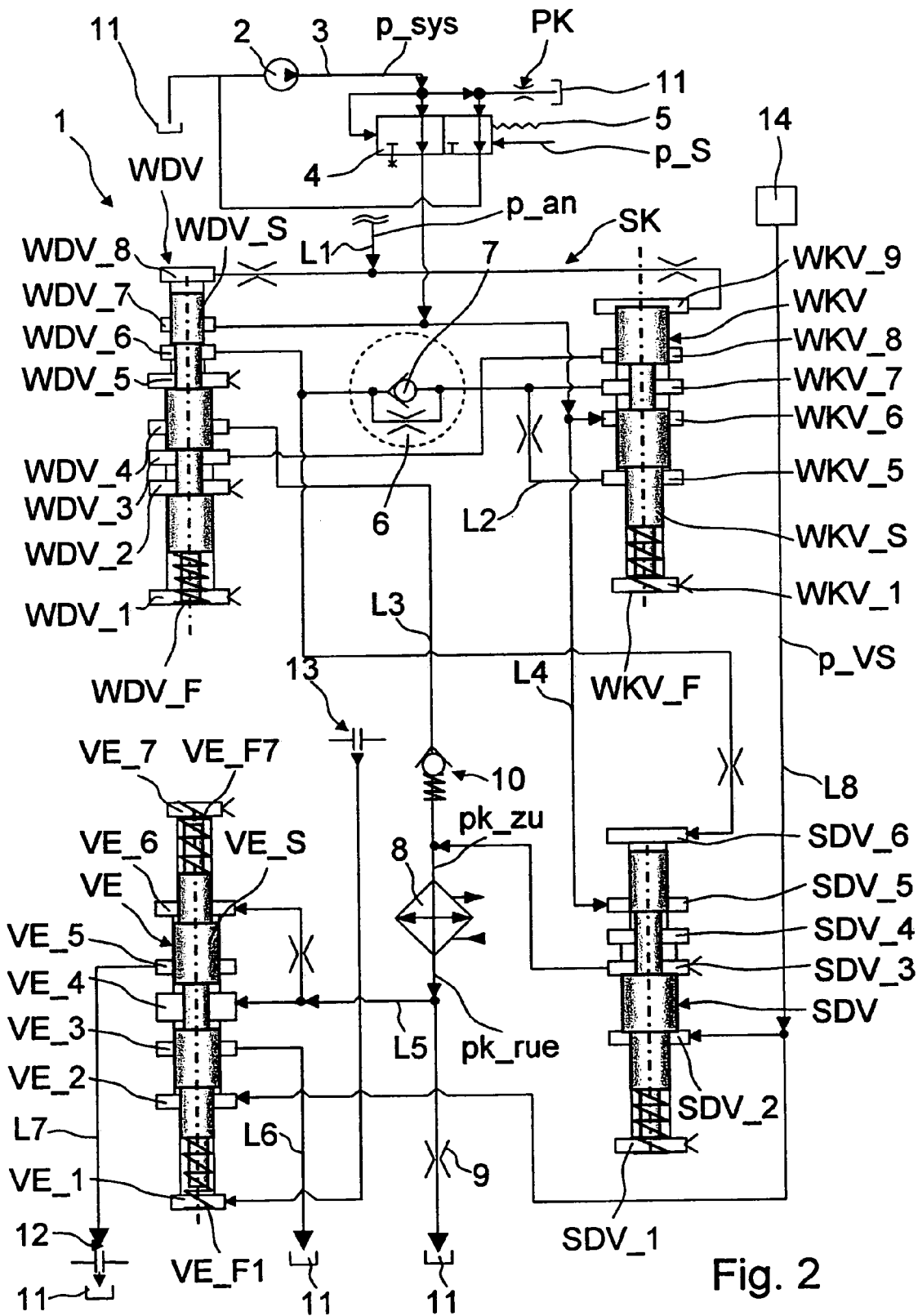
FIG. 2 shows a circuit diagram of a second embodiment of an inventively designed hydraulic system.
Figure 3:
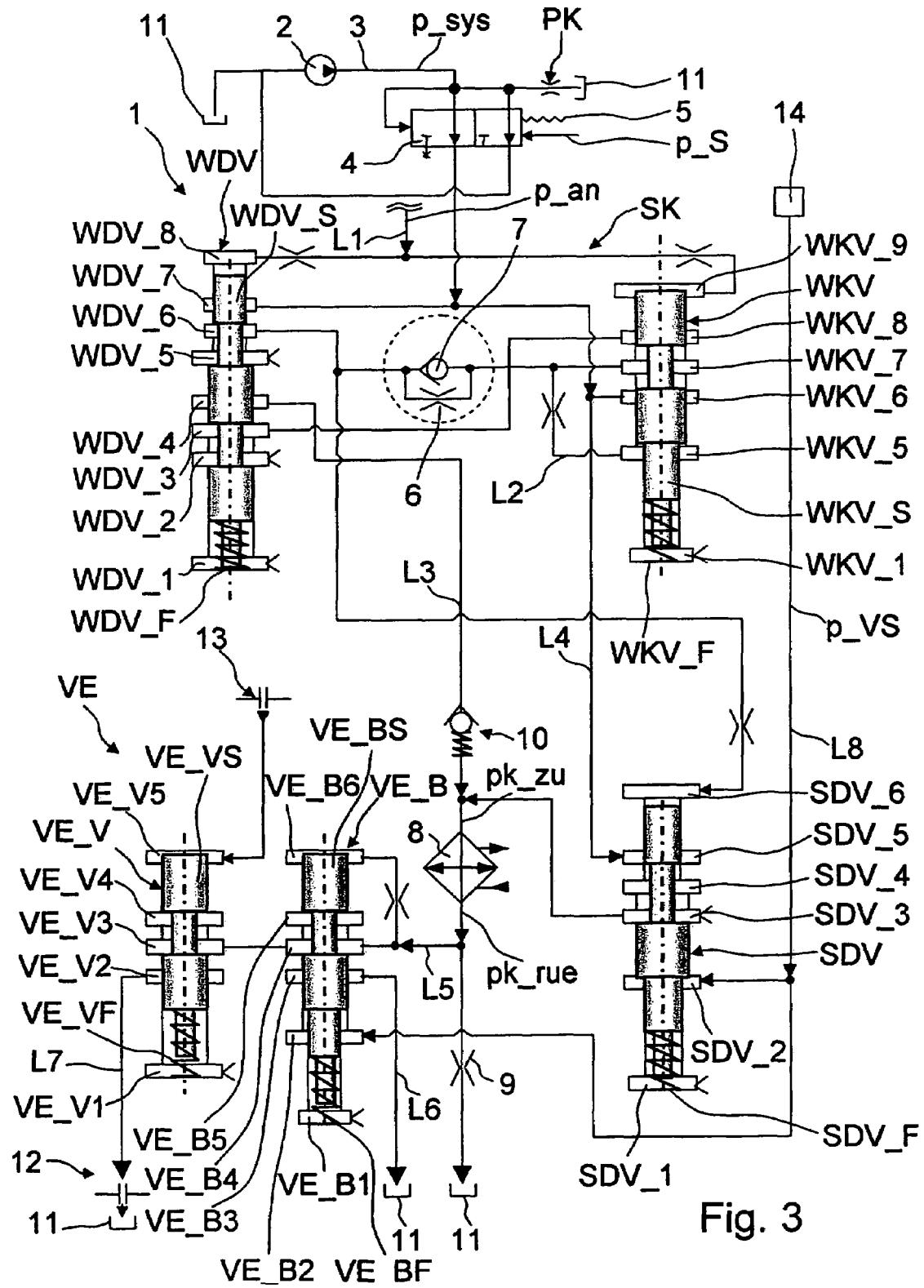
FIG. 3 shows a circuit diagram of a third embodiment of an inventively designed hydraulic system where the valve unit is designed with one pressure-limiting valve and one control valve.
Figure 4:
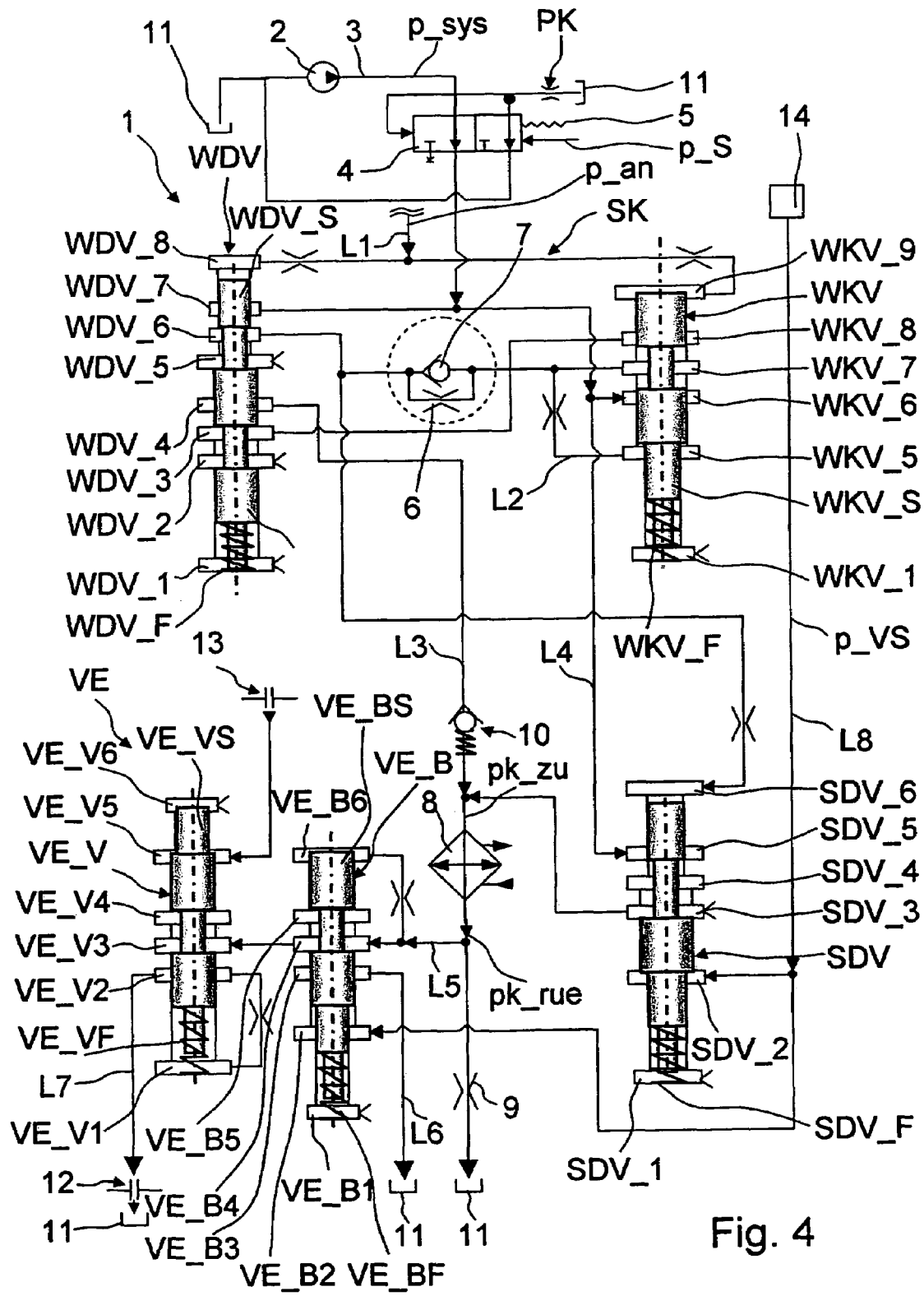
FIG. 4 shows a circuit diagram of a fourth embodiment on an inventively designed hydraulic system where the valve unit comprises one pressure-limiting valve and one regulating valve.

In FIG. 2 to FIG. 4 are shown three other embodiments of an inventively designed hydraulic system 1, which have fundamentally the same construction as the embodiment shown in FIG. 1 wherefore, for the sake of clarity, in the description that follows only the differences between the individual embodiments of the hydraulic system will be discussed.

The embodiment of the hydraulic system 1, shown in FIG. 2, differs from the hydraulic system shown in FIG. 1 in that the pilot pressure p_VS is applied to the lubrication pressure valve SDV and the valve unit VE directly and independently of the state of the converter clutch valve WKV by the hydraulic circuit 14 and the sixth control chamber SDV_6 of the lubrication pressure valve SDV is connected with the sixth control chamber WDV_6 of the converter clutch valve WDV so that the lubrication pressure valve SDV in the first operating state WK_auf is loaded with the converter pressure whereby the lubrication pressure SDV reliably blocks the hydraulic pipe L4 in the operating state of the hydraulic system 1.

Figure 5:
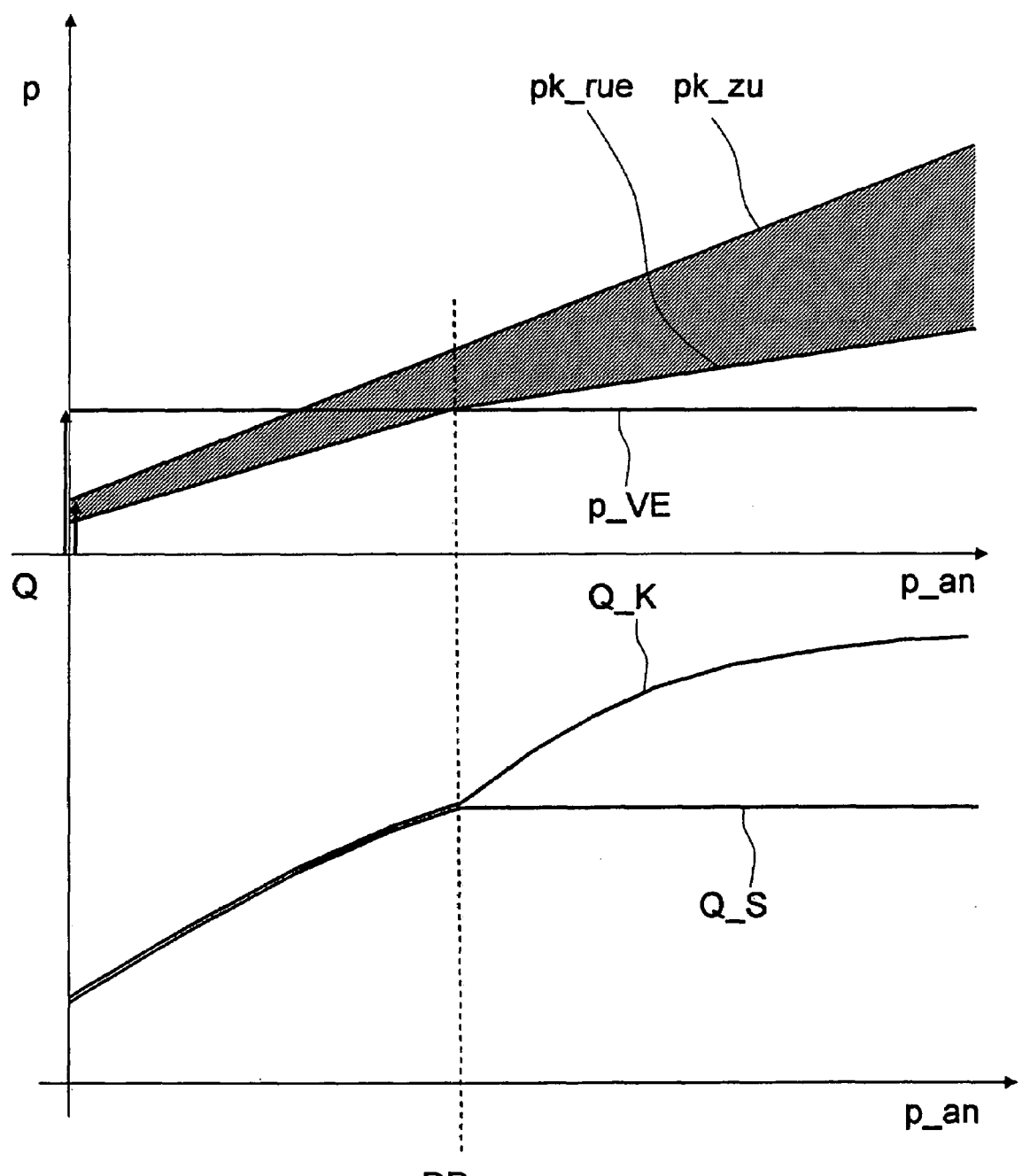
FIG. 5 shows several curves of different operating state parameters of the hydraulic system which are plotted over the control pressure of the converter clutch, a reaction pressure level of the valve unit being constant over the whole operating range of the transmission.

The embodiments of the hydraulic system according to FIG. 3 and FIG. 5 differ from the embodiment of the hydraulic system 1 shown in FIG. 2 essentially in the area of the valve unit VE which, in the hydraulic system 1 of FIG. 3 and FIG. 4 is formed by one pressure-limiting valve VE_B with control chambers VE_B1 to VE_B6, one spring mechanism VE_BF and one slide valve VE_BS and one other valve element VE_V with control chambers VE_V1 to VE_V4, one spring mechanism VE_VF and one slide valve VE_VS, the bypass pipe L5 being connectable via the pressure-limiting valve VE_B controllable by the pilot pressure p_VS with the hydraulic reservoir 11 and via the other valve element VE_V, according to the control pressure of the other shifting element 13 or the control quantity equivalent thereto, with the shifting element 12.

This means that the slide valve VE_BS of the pressure-limiting valve VE_B, via the pilot pressure p_VS, and depending on the pressure pk_rue prevailing after the cooling device 8 in the secondary pressure circuit SK, must be in a position such that the fourth pressure chamber VE_B4 of the pressure-limiting valve VE_B is connected with the third control chamber VE_B3 of the pressure-limiting valve VE_B and part of the hydraulic fluid flow rate passed via the cooling device 8 before the lubrication circuit 9 is branched off the secondary pressure circuit SK and sprayed off in the hydraulic fluid reservoir 11.

The hydraulic system 1 shown in FIG. 1 and FIG. 2, compared to the embodiments of the hydraulic system 1 shown in FIG. 3 and FIG. 4, represents an installation and cost friendly solution, since the shifting function for the cooling of the starting clutch and the bypass function of the pressure-limiting valve are implemented by a single combined valve. This results from the fact that the cooling function of the starting clutch or of the shifting element 12 is activated here only as or else function for pressure limitation or for limiting the hydraulic fluid flow rate passed via the lubrication circuit 9. Since the bypass function is active preferably only in the operating state WK_zu or in the regulation state of the converter clutch 7, the shifting from the bypass function in direction of the hydraulic reservoir 11 to the cooling function of the shifting element 12 can be activated in the operating state WK_auf of the transmission without changing effect.

It is obviously at the expert's discretion to develop the inventive hydraulic system so that the bypass pipe can be simultaneously connected with the hydraulic reservoir or the oil sump and be used for cooing with the shifting element.

In the design of the hydraulic system according to FIG. 3, the added valve element VE_V is designed as control valve, by way of the additional pipe L7 between the bypass pipe L5 and the shifting element 12, is opened under control in the presence of a predefined pressure value of the control pressure of the added shifting element 13 or of a predefined limiting value of the control quantity equivalent to the control pressure.

Since the fourth control chamber VE_B4 of the pressure-limiting valve VE_B is connected with the third control chamber VE_V3 of the control valve VE_V, it is possible when the control valve VE_V is properly controlled to pass in direction of the shifting element 12 the hydraulic fluid flow rate fed via the bypass pipe L5 via the second control chamber VE_V2 of the control valve VE_V of the valve unit VE and the additional pipe L7 and, during a starting operation in which a weakness of the prime mover is compensated via the shifting element 12 by a slip operation, to lubricate and cool the shifting element 12 or cool and lubricate it in addition to a cooling or lubrication (not shown in detail) and provided parallel therewith.

Differing from this, the added valve element VE_V in the hydraulic system 1, according to FIG. 4, is designed as a regulating valve by way of the connection between the bypass pipe L5 and the shifting element 12 can be regulatedly opened according to the control pressure of the added shifting element 13 or of the pressure quantity equivalent to the control pressure and the hydraulic pressure abutting on the added valve element VE_V via the bypass pipe L5.

The different embodiments of an inventively designed hydraulic system 1 for automatic transmissions, shown in FIG. 1 to FIG. 4, present a combined cooling lubricating system; the hydraulic flow rate of which in the area of the cooling device 8, the same as of the lubrication circuit 9, can be adapted to the existing operating state of the transmission and thus to the actually existing requirement of lubricating oil or cooling oil which, compared to hydraulic systems known from the prior art, is convertible without considerable extra cost in the area of the hydraulic control device of the transmission. Furthermore, with the different embodiments of the hydraulic system shown in the drawing, a starting clutch or the frictionally engaged shifting element 12 can be loaded within the transmission, as needed, with high amounts of cooling oil or hydraulic fluid flow rate.

With the inventive hydraulic system, the excessively high hydraulic fluid flow rate, subject to layout over the wide operating areas of an automatic transmission, can now be adjusted in the area of the lubrication circuit 9 over all operating states of an automatic transmission so that there is always passed, via the lubrication system of the transmission, precisely the hydraulic fluid flow rate actually needed.

Figure 6:
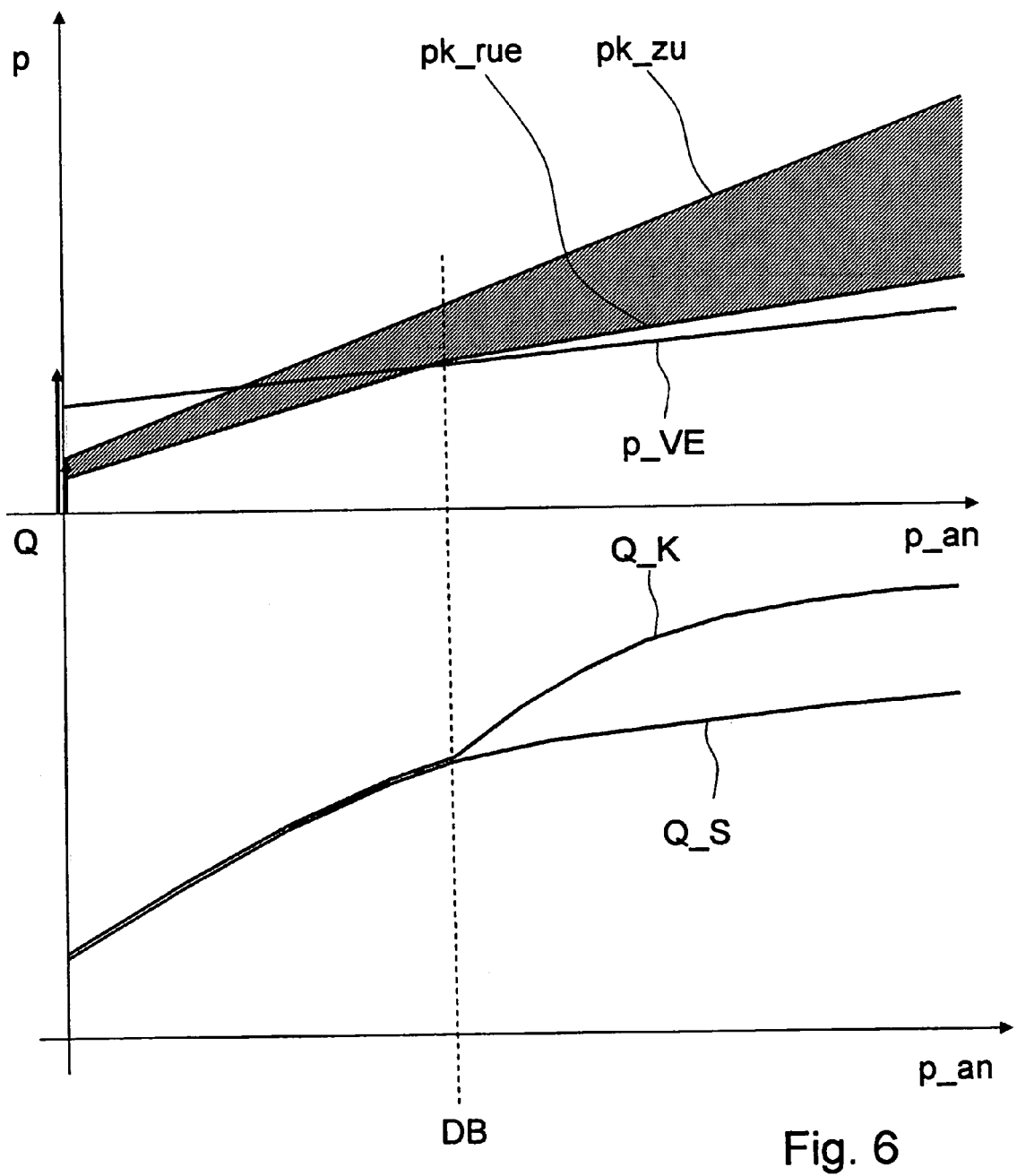
FIG. 6 shows the curves shown in FIG. 5 of the operating state parameters of the hydraulic system, the reaction pressure level of the valve unit varying over the operating range of the transmission.

In FIG. 5 and FIG. 6 are shown more curves of different operating state parameters of the hydraulic system 1 which are plotted over the control pressure p_an of the closed converter clutch 7.

In FIG. 5 is shown the hydraulic fluid flow rate Q_S appearing in the lubrication circuit 9 by the prescribed procedure of control of the different components of the hydraulic system 1 and which, with the inset of pressure limitation of the valve unit VE, as a consequence, has a constant hydraulic fluid flow rate Q_S in the lubrication circuit 9. The beginning of the pressure limitation of the valve unit VE is reproduced in FIG. 5 by the vertically extending broken line DB, a curve of the hydraulic fluid flow rate Q_K passed via the cooling device 8 prior to introducing the pressure limitation of the valve unit VE being almost the same as the curve shown by the hydraulic fluid flow rate Q_S passed through the lubrication circuit 9.

The beginning of the pressure limitation of the valve unit VE is specifically determined by the pressure curves pk_rue, pk_zu and p_VE plotted above the curves Q_K and Q_S of the flow rates by the intersection point between the curves pk_rue and p_VE. The curve pk_zu corresponds here to the pressure curve in the secondary pressure circuit SK before the cooling device 8 and the curve pk_rue to the pressure curve in the secondary pressure circuit SK after the cooling device 8 whereas the curve p_VE corresponds to the reaction pressure level of the valve unit VE at which the pressure limitation of the valve unit VE sets in.

In FIG. 6 are shown the curves shown in FIG. 5 of the operating state parameters of the hydraulic pressure system 1 according to FIG. 1 to FIG. 4, the curves of the operating state parameters shown in FIG. 6 resulting when the reaction pressure level p_VE is, likewise, raised with increasing control pressure p_an of the converter clutch 7. The consequence of the increase of the reaction pressure level p_VE of the valve unit VE with increasing control pressure p_an is that when the reaction pressure level p_VE of the valve unit VE is exceeded, not only does the hydraulic fluid flow rate Q_K passed via the cooling device 8 rise, but also the hydraulic fluid flow rate Q_S passed via the lubrication circuit 9 also increases; the rise of the hydraulic fluid flow rate Q_K passed via the cooling device 8 being greater than the rise of the hydraulic fluid flow rate Q_S passed via the lubrication circuit 9.

The embodiments, shown in the drawing of the inventively designed hydraulic system 1, can also be differently designed upstream of the cooling device wherein the control of the bypass pipe branching off between the cooling device and the lubrication circuit of the secondary pressure circuit has to be ensured so that the hydraulic fluid flow rate passed via the cooling device can be increased or decreased depending on the operating state and the hydraulic fluid flow rate passed via the lubrication circuit are, at the same time, adapted to the operating state of the transmission so that only the amount of hydraulic fluid needed for lubrication and cooling be passed through the lubrication circuit of the transmission and after the cooling device excessive hydraulic fluid be easily removed via the bypass pipe from the secondary pressure circuit.

| Reference numerals | |
|---|---|
| 1 | hydraulic system |
| 2 | pump |
| 3 | delivery side of the pump |
| 4 | system pressure valve |
| 5 | spring mechanism |
| 6 | hydrodynamic torque converter |
| 7 | regulated converter clutch |
| 8 | cooling device |
| 9 | lubrication circuit |
| 10 | recoil valve |
| 11 | hydraulic fluid reservoir |
| 12 | shifting element |
| 13 | additional shifting element |
| 14 | control circuit |
| L1 | feed pipe |
| L2 | pipe |
| L3 | connecting pipe |
| L4 | hydraulic pipe |
| L5 | bypass pipe |
| L6 | additional pipe |
| L7 | additional pipe |
| L8 | control pipe |
| p | pressure |
| p_an | control pressure for converter pressure valve and converter clutch valve |
| pk_zu | pressure in secondary circuit before cooling device |

-continued

| Reference numerals | |
|---|---|
| pk_rue | pressure in secondary circuit after cooling device |
| PK, SK | pressure circuits |
| p_S | control pressure |
| p_sys | system pressure |
| p_VE | reaction pressure value of the valve unit |
| p_VS | pilot pressure |
| Q | hydraulic fluid flow rate |
| Q_K | hydraulic fluid flow rate through cooling device |
| Q_S | hydraulic fluid flow rate through lubrication circuit |
| SDV | lubrication pressure valve |
| SDV_F | spring mechanism of the lubrication pressure valve |
| SDV_S | slide valve of the lubrication pressure valve |
| SDV_1 to SDV_6 | control chamber of the lubrication pressure valve |
| VE | valve unit |
| VE_B | pressure-limiting valve of the valve unit |
| VE_BF | spring mechanism of pressure-limiting valve |
| VE_BS | slide valve of the pressure-limiting valve |
| VE_B1 to VE_B6 | control chamber of pressure-limiting valve |
| VE_F1 | spring mechanism of the valve unit |
| VE_F7 | spring mechanism of the valve unit |
| VE_S | slide valve of the valve unit |
| VE_V | added valve element of the valve unit |
| VE_VF | spring mechanism of added valve element |
| VE_VS | slide valve of the added valve element |
| VE_V1 to VE_V4 | control chamber of added valve element |
| WDV | converter pressure valve |
| WDV_S | slide valve of the converter pressure valve |
| WDV_1 to WDV_8 | control chamber of the converter pressure valve |
| WKV | converter clutch valve |
| WKV_F | spring mechanism of converter clutch valve |
| WKV_S | slide valve of converter pressure valve |
| WKV_1 to WKV_9 | control chamber of the converter clutch valve |
| WK_auf | first operating state |
| WK_zu | secondary operating state |

The invention claimed is:

1. A hydraulic system (1) for an automatic transmission of a motor vehicle, the hydraulic system comprising primary and secondary pressure circuits (PK, SK) which can be loaded with hydraulic fluid from a pressure source (2) and in relation to a supply with hydraulic fluid of different areas of the transmission are differently prioritized, a pressure in each of the primary and the secondary pressure circuits (PK, SK) is adjustable, according to a system valve (4), and the secondary pressure circuit (SK) comprises at least one cooling device (8) for cooling the hydraulic fluid and a lubrication circuit (9) located downstream of the cooling device (8), between the cooling device (8) and the lubrication circuit (9), one bypass pipe (L5), blockable via a valve unit (VE), is provided which can be controlled via the valve unit (VE) so that a hydraulic fluid flow rate (Q_K) supplied, via the cooling device (8), is adjustable without changing a hydraulic fluid flow rate (Q_S) to be supplied to the lubrication circuit (9).

2. The hydraulic system according to claim 1, wherein the secondary pressure circuit (SK) is connected, via the bypass pipe (L5), with one shifting element (12) so that at least part of the hydraulic fluid flow rate (Q_K) passed through the cooling device (8), for cooling the shifting element (12), can be branched off the first pressure circuit (SK) before the lubrication circuit (9).

3. The hydraulic system according to claim 1, wherein the secondary pressure circuit (SK), from which the bypass pipe (L5) branches off, is a hydrodynamic torque converter (6) and a regulated converter clutch (7) which are located upstream of the cooling device (8).

4. The hydraulic system according to claim 3, wherein the hydrodynamic torque converter (6) is loaded with hydraulic fluid via a converter pressure valve (WDV) situated between the system valve (4) and the hydrodynamic torque converter (6).

5. The hydraulic system according to claim 4, where a recoil valve (10) is provided, between the converter pressure valve (WDV) and the cooling device (8), in a connecting pipe (L3).

6. The hydraulic system according to claim 5, wherein the hydraulic pipe (L4) discharges downstream of the recoil valve (10) in the connecting pipe (L3).

7. The hydraulic system according to claim 3, wherein the regulated converter clutch (7) is controlled via a converter clutch valve (WKV) situated between the system pressure valve (4) and the regulated converter clutch (7).

8. The hydraulic system according to claim 7, wherein the secondary pressure circuit (SK) is connected with the bypass pipe (L5) so that the hydraulic fluid flow rate (Q_K) to be cooled in the cooing device (8), when the regulated converter clutch (7) is disengaged, is passed from the system pressure valve (4) to the cooling device (8) via a converter pressure valve (WDV), the hydrodynamic torque converter (6), the converter clutch valve (WKV) and the converter pressure valve (WDV).

9. The hydraulic system according to claim 7, wherein a lubrication pressure valve (SDV) is provided, in a second hydraulic pipe (L4) extending between the system pressure valve (4) and the cooling device (8), by which the hydraulic fluid flow rate (Q_K) to be cooled is fed to the cooling device (8) when the converter clutch (7) is engaged.

10. The hydraulic system according to claim 9, wherein an initial pressure (pk_zu) of the cooling device (8), when the converter clutch (7) is engaged, is regulated via the lubrication pressure valve (SDV), said lubrication pressure valve (SDV) is controlled by a hydraulic control circuit (14) with a pilot pressure (p_VS).

11. The hydraulic system according to claim 10, wherein the valve unit (VE) is controlled via the pilot pressure (p_VS) of the hydraulic control circuit (14).

12. The hydraulic system according to claim 11, wherein a connection between at least one of the hydraulic control circuit (14) and the lubrication pressure valve (SDV) and the hydraulic control circuit (14) and the valve unit (VE) is blocked by the converter clutch valve (WKV) when the converter clutch (7) is disengaged.

13. The hydraulic system according to claim 11, wherein the hydraulic control circuit (14) is directly connected with the lubrication pressure valve (SDV) and the valve unit (VE).

14. The hydraulic system according to claim 9, wherein the lubrication pressure valve (SDV) is connected via the converter pressure valve (WDV) with the torque converter (6) so that an exit pressure of the torque converter (6) abuts as a pressure force acting on the lubrication pressure valve (SDV) in a closing direction of the lubrication pressure valve (SDV).

15. The hydraulic system according to claim 1, wherein the valve unit (VE) is controlled with a pressure of one other shifting element (13) of the transmission which is engaged to produce a starting ratio in the power flow of the transmission or with a control quantity equivalent to the control pressure so that a shifting element (12) connectable via the bypass pipe (L5) with the secondary pressure circuit (SK) is loaded with the hydraulic fluid via the bypass pipe (L5).

16. The hydraulic system according to claim 1, wherein the valve unit (VE) has at least one pressure-limiting valve (VE_B).

17. The hydraulic system according to claim 1, wherein the valve unit (VE) is formed by at least one pressure-limiting valve (VE_B) and one other valve element (VE_V), the bypass pipe (L5) is connectable via the pressure-limiting valve (VE_B) controllable via a pilot pressure (p_VS) with at least one of a hydraulic fluid reservoir (11) and via the other valve element (VE_V) according to a control pressure of the added shifting element (VE_V) or a control quantity equivalent thereto.

18. The hydraulic system according to claim 17, wherein the added valve element (VE_V) is a control valve by which a connection (L7) between the bypass pipe (L5) and a shifting element (12) is opened under control in a pressure of a predefined value of a control pressure of an added shifting element (13) or in the presence of a predefined limiting value of the control quantity equivalent to the control pressure.

19. The hydraulic system according to claim 17, wherein the added valve element (VE_V) is a regulating valve by which the connection (L7) between the bypass pipe (L5) and a shifting element (12) is regulatedly opened, depending on a control pressure of an added shifting element (13) or on the control quantity equivalent to the control pressure and the hydraulic pressure abutting via the bypass pipe (L5) on the added valve element (VE_V).

20. A hydraulic system (1) for a transmission, comprising:
a pressure source (2) for providing hydraulic fluid to a primary pressure circuit (PK) at a first pressure and providing hydraulic fluid to a secondary pressure circuit (SK) at a second pressure adjustable by a system valve (4), and
in the secondary pressure circuit (SK),
at least one hydraulic fluid cooling device (8);
a lubrication circuit (9) is located downstream of the cooing device (8) for receiving cooled hydraulic fluid from the cooling device (8), and
a bypass pipe (L5) and an adjustably blockable valve unit (VE) connected with the second pressure circuit (SK), between the cooling device (8) and the lubrication circuit (9), bypassing the lubrication circuit (9), whereby
a hydraulic fluid flow rate through the bypass pipe (5) is adjustable by the blockable valve unit (VE) so that a hydraulic fluid flow rate ($Q_K$) through the cooling device (8) is variable while a hydraulic fluid flow rate (Q_S) to the lubrication circuit (9) is constant.

* * * * *